(12) United States Patent
Daumal Castellon

(10) Patent No.: US 8,187,109 B2
(45) Date of Patent: May 29, 2012

(54) LOW LOAD SLIDING INTERMEDIATE SHAFT IN A STEERING COLUMN FOR INDUSTRIAL VEHICLES

(76) Inventor: Melchor Daumal Castellon, Barcelona (ES)

( * ) Notice: Subject to any disclaimer, the term of this patent is extended or adjusted under 35 U.S.C. 154(b) by 59 days.

(21) Appl. No.: 11/921,516

(22) PCT Filed: Aug. 30, 2006

(86) PCT No.: PCT/ES2006/000494
§ 371 (c)(1),
(2), (4) Date: Jan. 3, 2008

(87) PCT Pub. No.: WO2007/065960
PCT Pub. Date: Jun. 14, 2007

(65) Prior Publication Data
US 2009/0025503 A1    Jan. 29, 2009

(30) Foreign Application Priority Data
Dec. 5, 2005   (ES) .................................. 200503011

(51) Int. Cl.
*F16D 3/06* (2006.01)
(52) U.S. Cl. ..................................... 464/162; 403/109.5
(58) Field of Classification Search ................ 464/162; 403/379.3, 109.4, 109.5, 362, 383; 280/775; 74/493
See application file for complete search history.

(56) References Cited

U.S. PATENT DOCUMENTS

| | | | | | |
|---|---|---|---|---|---|
| 2,116,290 | A | * | 5/1938 | Spicer | 464/162 |
| 3,604,734 | A | * | 9/1971 | Friedman et al. | 403/109.5 X |
| 4,402,236 | A | * | 9/1983 | Nishikawa | 74/493 |
| 4,833,936 | A | * | 5/1989 | Mariani et al. | 74/493 |
| 7,226,082 | B2 | * | 6/2007 | Muramatsu et al. | 280/775 |

FOREIGN PATENT DOCUMENTS

| | | |
|---|---|---|
| EP | 0 936 130 | 8/1999 |
| ES | 2 238 009 | 8/2005 |
| GB | 1120799 | 7/1968 |

OTHER PUBLICATIONS

English abstract of ES2238009 is included with reference copy.

\* cited by examiner

*Primary Examiner* — Gregory Binda
(74) *Attorney, Agent, or Firm* — Dowell & Dowell, P.C.

(57) ABSTRACT

An intermediate shaft to adjust the height of a steering wheel to match a driver's measurements, to absorb vibrations which may be generated by the wheels and suspension up to the steering wheel, and to act as a safety measure to collapse in the event of an accident. The shaft utilizes corresponding screw/nut mechanisms comprising a nut rigidly connected to the intermediate shaft on one of the flat surfaces of a female shaft and a screw which turns to tighten a male shaft via an adjustment strip to allow adjustment of the sliding load and the torsional rigidity and hysteresis of the sliding intermediate shaft.

4 Claims, 3 Drawing Sheets

DETAIL 1

LOW LOAD SLIDING INTERMEDIATE SHAFT IN A STEERING COLUMN FOR INDUSTRIAL VEHICLES

SUMMARY OF THE INVENTION

Field of the Invention

The invention refers to improvements to the intermediate shaft to adjust the depth of the steering wheel to match the driver's measurements, to absorb vibrations which may be generated by the wheels and suspension up to the steering wheel, as well as acting as a safety measure to collapse in the event of an accident. The invention utilizes corresponding screw/nut mechanisms comprising a nut rigidly connected to the intermediate shaft on one of the flat surfaces of the female shaft and a screw which tightens the male shaft via an adjustment strip.

When the screw is not tightened, the male shaft gently slides relative to the female shaft with a predetermined load deemed to be suitable for facilitating sliding by hand. As a result, the operator who is working on the assembly line to raise the column is able to extend the steering column without great effort, thereby facilitating vehicle assembly work using the steering pinion and/or the steering column.

Once the steering column has been assembled, the screws are then tightened so that the sliding joint becomes a strong joint giving the steering system great torsional and hysteresis rigidity. This is due to the action of the force that the screw applies in the direction of its axis and due to the reaction of the triangular faces on the female shaft onto which the force is exerted.

The mechanism which is built into the intermediate shaft shall include a nut which, due to its intrinsic function, cooperates with an intermediate steering shaft. The nut has to be safe and be able to operate with different coverings guaranteeing its function against unwanted environmental effects so that corrosion and/or loss or mechanical or chemical properties in the materials are avoided and/or guaranteeing the appearance requirements which may be required by the customer.

As stated in the above paragraph, the nut has to be safe, ensuring its perfect operation without it affecting the complete tightening of the screw. In order to do this, the nut may be, although not limited to, oval, with a plastic retainer, or similar, so that any unexpected loosening of the screw inserted into the nut is avoided. This function is only taken into account when there is no locking feature on the screw.

Similarly, the mechanical features and dimensions of the nut have to ensure the above mentioned safety function when the screw is threaded into the nut, with, as a general rule, the improved quality of the same.

If the dimensional characteristics of the thread are significant, the external properties of the nut are not so significant, with the nut being in the most suitable external shape and size, such as hexagonal, cylindrical, square or similar, to minimize the turning diameter of the intermediate shaft.

When securing the nut onto the flat surface of the female shaft to form part of the intermediate shaft, the joint between the nut and shaft has to be rigid. Therefore, for example, welding, pinning the nut or encapsulating the nut without denigrating any other method, may be acceptable means for attaching the nut to the female shaft with the desired rigidity and consistency of the nut/female shaft joint.

One of the surfaces of the female shaft has to be prepared so that, firstly, depending on the way the nut is attached, the shaft is able to house the nut. For example, with the exception of the nut being welded to the shaft, which requires no previous preparation to the shaft, the shaft may be prepared with a calibrated diameter in the case of a pinned nut. Similarly, when the nut is encapsulated, the nut must be held by the cage itself. Secondly, the female shaft has to be perforated, by any method such as drilling, punching or other, so that the screw is able to pass through the shaft and preform the tightening function on the male shaft against the two triangular faces of the female shaft.

The function of the screw is safety, so the screw is equipped with the means required to prevent it from loosening during the vehicle's assembly. In order to do this, without detriment to the possible use of any other method, any method available on the market may be used, such as, the trilobular system, sealed with nut holders or similar.

Notwithstanding the above, the shape of the screw head, where the screwdriver is applied, may be different, such as, hexagonal, Allen, Phillips or other, wherever these ensure the tightening torque not only for the operator, but also for the integrity of the tool applying the torque and for the screw itself, both on the head and on the thread.

As stated previously for the nut, the dimensional and material properties of the screw have to be appropriate for the torque to be applied and for the application of the same, with the quality and properties of the thread being the most appropriate.

Similarly, to determine the length of the screw, the diameter of the turning circle for the intermediate shaft has to be taken into account once the screw has been inserted into the nut holding it. As the turning has to be very limited, normally less than one turn, and due to the fact that the screw only has to move axially along the distance required to adjust it, which usually is less than the passage of the screw, the length of the screw may be very short.

The advantages of the improvements described with the low load intermediate shaft are being able to combine an easy movement of the shaft in the first part of the column assembly, when the screw is loose, and providing a shaft assembly with torsional and hysteresis rigidity due to the subsequent tightening of the screw.

Alternatively, another of the aims of the present invention is the option of converting the intermediate shaft into a sliding shaft with the option to adjust the sliding load and the torsional and hysteresis rigidity achieved by the increased or decreased axial movement of the screw as a consequence of the greater or lesser turning angle applied during tightening, the number of screws, the distance between the screws on the female shaft, and the surface of the base of each of the screws. This shall be of great use in the event that the shafts have to slide while under a great load, as is common in 4×4 vehicles and height adjustable columns where the pivoting point does not coincide with the centre of the universal joint on the column connection or when the universal joint moves spatially due to the adjustment movements.

Moreover, a sliding intermediate shaft that is triangular in cross section allows perfect adjustment as a result of the force of the screw applied to the opposing triangular face. While it is possible to adjust shafts with other cross sections, such as circular (grooved or otherwise), double D shaped, right angled and other shapes, it is difficult to safely and reliably adjust these shafts.

Another benefit the present invention provides is the absence of noise caused by the effects of resonance caused by parts outside the steering system. This noise usually affects the intermediate shaft as the intermediate shaft is the weakest part of the chassis and bodywork joint. The invention changes the rigidity of the intermediate shaft, modifying the resonance frequency of the shaft and making noise inaudible which, in another way, appears in the system.

Field trials have been performed to check the suitability of the present invention on the environmental properties and to indicate its suitability in every type of temperature and operating condition. The invention provides improvement in not just the shaft situation, but also in the engine section or in the passenger compartment.

Finally, the excellent behaviour with regard to wear makes the invention ideal for intermediate shafts subjected to significant and demanding operating life and fatigue requirements. The possibility of adjusting the screw with a simple servicing operation allows the worn intermediate shaft, with its rigidity and angular play properties, to become a shaft with similar properties, if not the same properties, as a new intermediate shaft.

Other details and characteristics shall be shown throughout the description below referring to drawings attached to this report demonstrating the main properties of the invention without the same being solely restricted to it.

Below is a list of the main parts in the invention which are shown in figures attached to this application; (10) intermediate shaft, (11) female part, (12 and 13) universal joint, (14) male part, (15) metal strip, (16) holding cage, (18) screws, (19) nuts, (20) drilled holes, (21) openings, (22) shaft face, (23) screw base (18), (24) beveling.

DESCRIPTION OF THE PREFERRED EMBODIMENT

Figure 1:
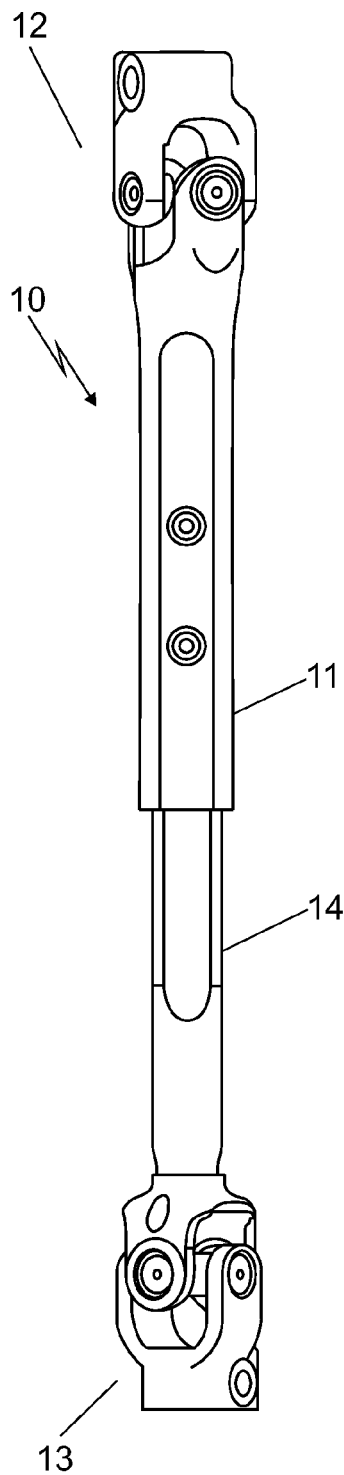
FIG. 1 is a front elevation view of the intermediate shaft (10), the subject of these improvements in which the male shaft (14) is partially placed into the female shaft (11), on one of the ends of (11-14) the universal joints (12-13).
Figure 2:
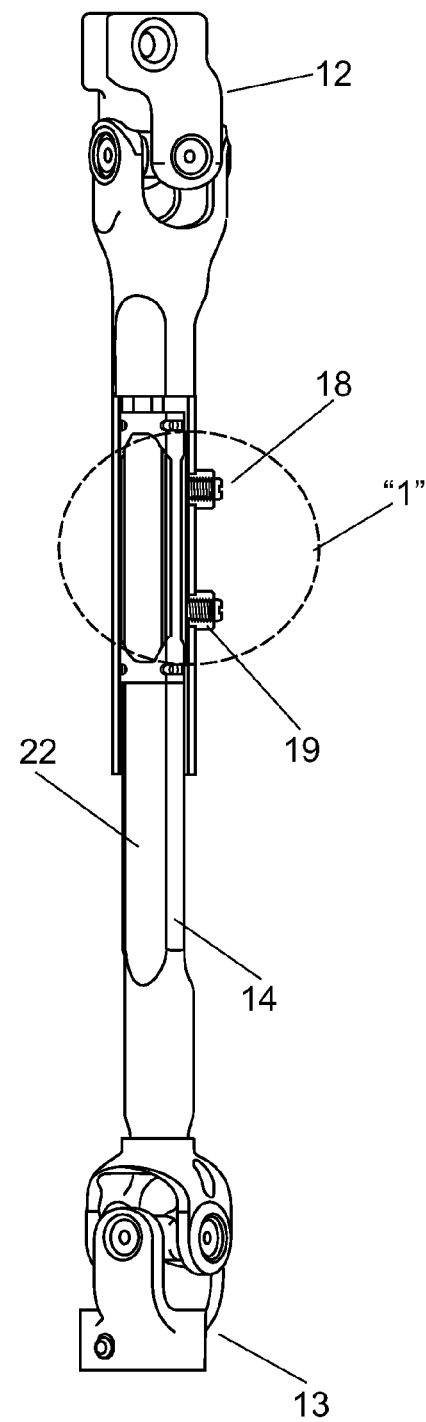
FIG. 2 is a rotated view compared to FIG. 1 with regard to the longitudinal shaft crossing (10) longitudinally.

In one of the preferred implementations of the present invention as shown in FIGS. 1 and 2, intermediate shaft (10) includes a female shaft (11) having of openings (21) on at least one of the female faces. The openings (21) allow the assembly of a mechanism formed by a nut (19) and a screw (18), with the latter passing through a drilled hole (20) in the nut (19).

Figure 3:
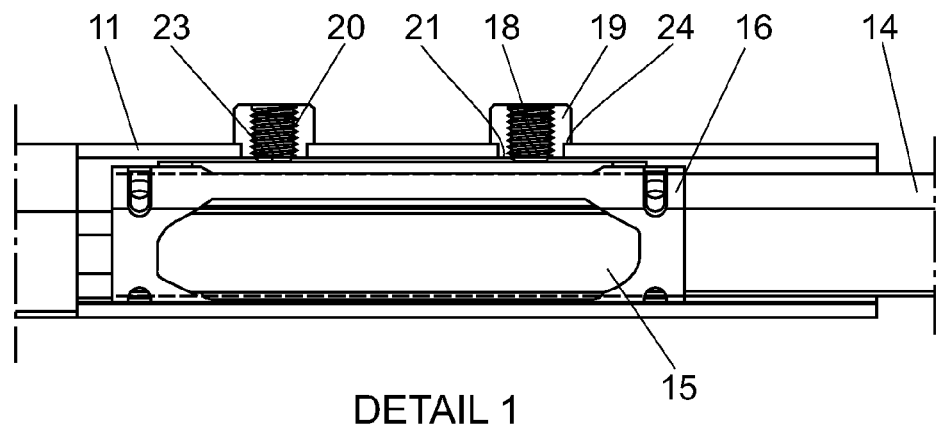
FIG. 3 is a detail "1" according to FIG. 2.
Figure 4:
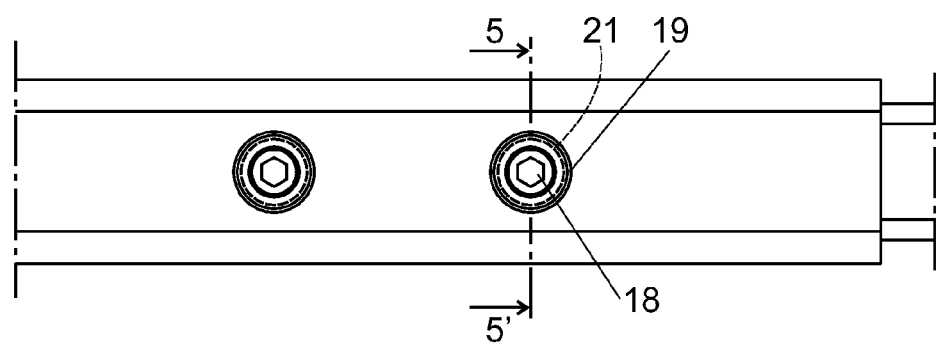
FIG. 4 is a partial elevation view of the described intermediate shaft (10).

FIG. 3 shows detail "1" according to FIG. 2, demonstrating how the bases (23) of the screw (18) rest on the upper surface of the metal strip (15) inserted in housings of the cage (16), the rear of the metal strip (15) is in contact with the male shaft (14).

Figure 5:
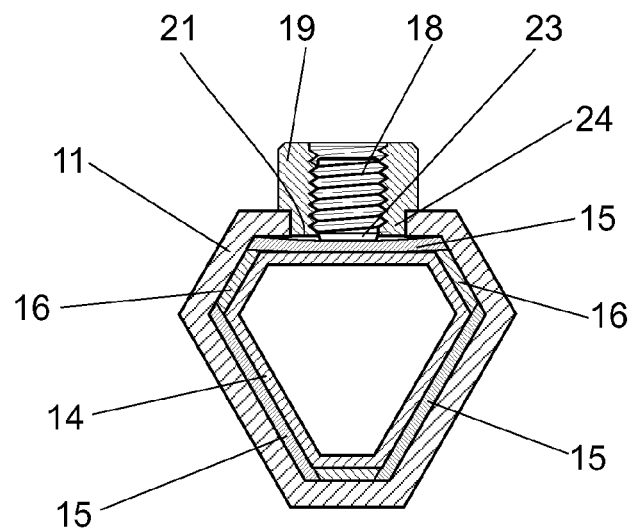
FIG. 5 is a cross-sectional view taken along line A-A' of FIG. 4.

The nut (19) has been designed with a small lower bevel (24) which is supported on the opening (21), as shown in FIG. 5.

Greater or lesser pressure on the bases (23) of the screws (18) on the metal strip (15), causes more or less retaining strength of shaft (14) with regard to shaft (11), in the assembly position of the steering column with the bases (23) not being in contact with the male shaft (14) and more specifically with the surface of the strips (15), depending on the loads required in each case, allowing the calculation of different base values to join more than two screws (18), as well as changing the magnitude of the base surface (23), its roughness and the distance between the screws (18) within the female shaft (11), so that it will be possible to attain values consistent with the loads which each car manufacturer assigns to the manufacture of the steering column.

Therefore without any need for applying the mechanism to more than one face (22) of the male shaft (14), the force of the screws (18) is transferred to the other metal strips (15), an effect produced as a consequence of the initial design of the transverse section of the triangular intermediate shaft.

Having sufficiently described this invention using the figures attached, it is easy to understand that any changes judged to be suitable may be made, whenever these changes do not alter of the essence of the invention summarized in the following claims.

The invention claimed is:

1. An intermediate shaft in a steering column for industrial vehicles comprising:
   a female element designed to house a male part by sliding said female element into said male part; and
   at least one strip mounted between said female element and said male part which has a contact surface; said at least one strip is assembled between said male part and said female part and inside a holding cage, where said holding cage is fastened to the external surface of said male part with said cage being located on said male part,
   safety screws (18) each having a screw base (23) attached to said at least one strip (15) for pressing on said at least one strip (15) inserted in said cage (16), said safety screws (18) protruding through openings (21) in at least one face of said female shaft (11), wherein said safety screws (18) are threaded onto nuts (19) each having a bevel (24) that is supported by one of said openings (21) of said female shaft such that threading and unthreading of said screws (18) on said nuts (19) applies pressure onto said strip (15) to adjust a sliding load, torsional rigidity and hysteresis of the sliding intermediate shaft.

2. The intermediate shaft according to claim 1, wherein said male shaft (14) with regard to said female shaft (11) and the rigidity and hysteresis characteristics of the intermediate shaft (10) depend on the number of said screws (18) and the tightening applied to said female shaft (11).

3. The intermediate shaft according to claim 1, wherein said male shaft (14) with regard to said female shaft (11) and the rigidity and hysteresis characteristics of the intermediate shaft (10) depend on the distance between said screws (18) in said female shaft (11).

4. The intermediate shaft according to claim 1, wherein said male shaft (14) with regard to said female shaft (11) and the rigidity and hysteresis characteristics of the intermediate shaft (10) depend on the surface of the base (23) of said screws (18).

* * * * *